UNITED STATES PATENT OFFICE.

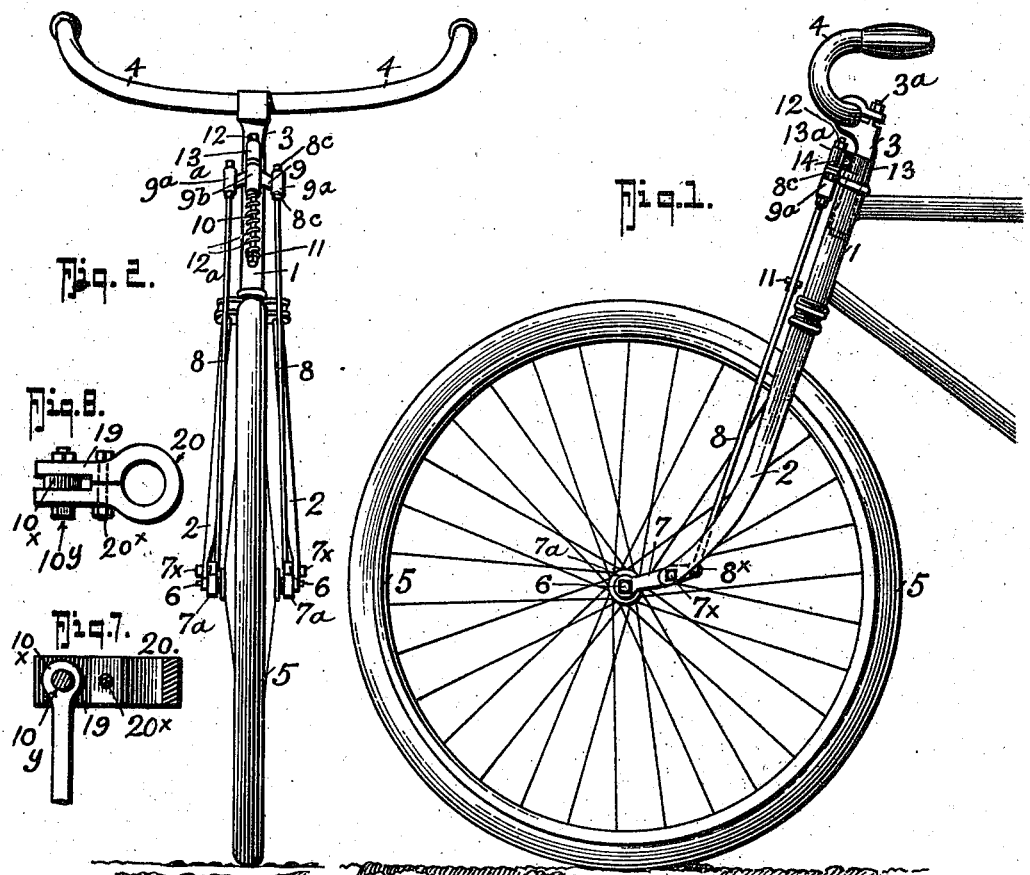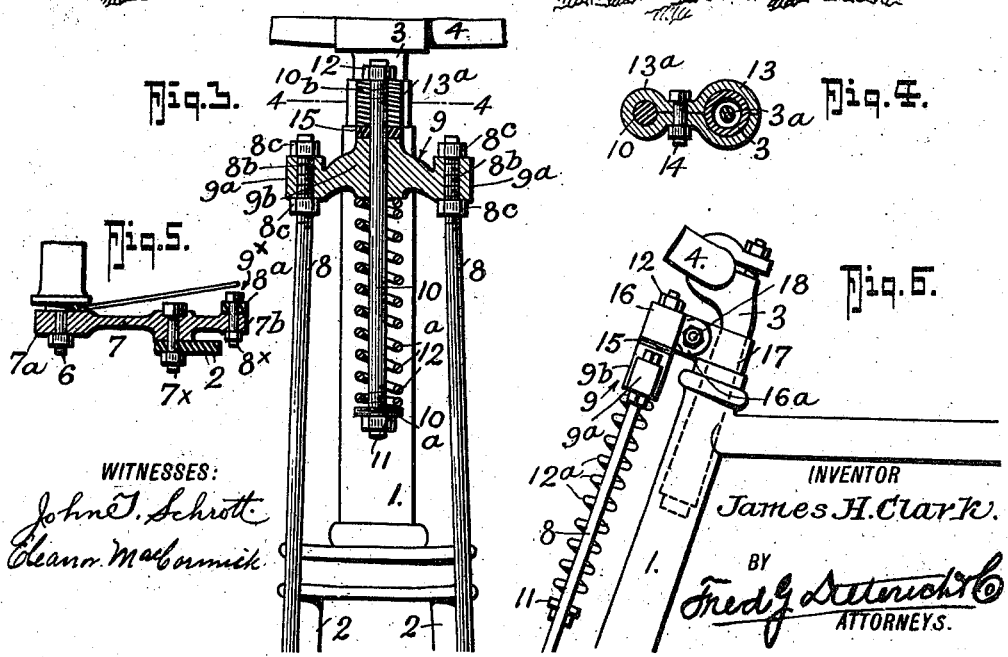

JAMES H. CLARK, OF RICHMOND, VIRGINIA, ASSIGNOR OF ONE-HALF TO J. E. QUARLES, OF RICHMOND, VIRGINIA.

BICYCLE ATTACHMENT.

963,730. Specification of Letters Patent. Patented July 5, 1910.

Application filed October 26, 1909. Serial No. 524,733.

*To all whom it may concern:*

Be it known that I, JAMES H. CLARK, residing at Richmond, in the county of Henrico and State of Virginia, have invented certain new and useful Improvements in Bicycle Attachments, of which the following is a specification.

My invention relates to certain new and useful improvements in spring fork construction for bicycles and other vehicles, and it primarily has for its object to provide a shock absorbing device for attachment to any of the types of bicycles now in common use, which device is of a simple and effective construction which can be easily and cheaply manufactured and which will readily and effectively serve its intended purposes.

The device in its generic nature comprises a pair of rocker arms or levers connected to the axle of the wheel and to the forks of the machine and a pair of connecting rods secured to the rocker arms or levers and connected with a cross head under spring tension that is held at the top of the fork bearing portion of the frame by a bracket embracing the handle bar stem.

More specifically the invention resides in those novel details of construction, combination and arrangement of parts all of which will be first fully described, then be specifically pointed out in the appended claims, and illustrated in the accompanying drawings, in which:

Figure 1, is a side elevation of a portion of a bicycle embodying my invention. Fig. 2, is a front view thereof. Fig. 3, is an enlarged cross sectional view of a part of my invention. Fig. 4, is a horizontal section on the line 4—4 of Fig. 3. Fig. 5, is an enlarged sectional view illustrating the rocker arm and the method of connecting the same in position. Fig. 6, is a detail side elevation of a modified construction. Fig. 7, is a detail sectional view of a further modification. Fig. 8, is a top plan view of the modified form shown in Fig. 7.

Referring now to the accompanying drawings in which like letters and numerals of reference indicate like parts in all of the figures, 1 represents a bicycle of any type now in common use, which has the usual forks 2, handle bar 4, handle bar stem 3 and clamp mechanism $3^a$. The wheel 5 in applying my invention is removed from the forks 2 and connected to the ends $7^a$ of a pair of rocker arms or levers 7, as at 6, the levers being then pivoted at $7^x$ to the forks 2. The lever 7 is made with its longest portion provided with the bearings $7^a$ and has a laterally projecting short arm terminating in a bearing pin $7^b$ to which the connecting rods 8 are pivoted as at $9^x$, in any approved manner, for example, by bolts that pass through the flattened portion $8^a$ of the connecting rods 8 or in any approved manner.

13 designates a split clamp held together by a bolt and nut 14 and provided with a bearing $13^a$ into which a rod 10 is threaded and secured by a check nut 12. The clamp 13 embraces the handle bar stem 3 between the clamp head thereof and the bicycle frame, as shown in Figs. 1 and 3, of the drawings.

The rod 10 carries a cross head 9 and it has a central bearing $9^b$ to receive the rod 10 and laterally extended bearings $9^a$ into which the connecting rods 8 are threaded and secured by check nuts $8^c$, as shown. On the rod 10 is a spring 12 which lies between the cross head 9 and an abutment 11, at the lower end of the rod 10. Between the clamp 13 and the cross head 9 a washer 15 of rubber, leather or other suitable material is interposed on the rod 10, as shown.

Instead of making the clamp 13 an integral structure, as shown in Fig. 4, it may be formed of two parts 16—17, pivoted together through ears $16^a$ by a pivot bolt 18 to allow for adjustment of the cross head to properly position the connecting rods 8, or such clamp 13 may be constructed as shown in Figs. 7 and 8, by reference to which it will be seen that the rod 10 has a flattened end $10^x$ pivoted at $10^y$ between the ears 19 of the split clamp 20 which is held tight by a bolt $20^x$, as shown.

In the application of my invention the parts 13—17 and 20, as the case may be, are secured in place by simply removing the handle bar stem 3 slipping the clamp on the stem and reinserting the same into the frame and tightening upon the expander mechanism $3^a$ of the same.

Thus it will be seen I have provided a simple and effectively constructed shock absorbing device of the type referred to, that can be easily and cheaply manufactured and that may be applied to any bicycle now in common use without in any way altering the construction of the machine.

In practice the connecting rods 8 are made of a slightly longer length than is usually necessary and the rod 10 is also made slightly longer to allow for different heights of bicycle frames and after the attachment has been applied to the bicycle the projecting portions of such rods may be cut off, as will be clear to any skilled mechanic.

I am aware that prior to my invention, devices of this type have been attempted, but no construction has been disclosed to my knowledge, that can be attached to the types of bicycles now in common use, without altering or in some way changing the construction of the bicycle wheel, whereas by the use of my invention should the rider tire of the attachment he can remove the same and his bicycle will be in the same condition as it was before the device was placed thereon.

What I claim is:

1. An attachment for bicycles and the like comprising a clamp securable to the handle bar stem, a rod held by said clamp, a spring pressed cross head slidably mounted on said rod, a pair of rocker arms secured to the forks and wheel of a bicycle, and connecting rods between said rocker arms and said cross head.

2. An attachment for bicycles and the like comprising a pair of rocker arms pivoted to the forks of a bicycle and connected with the front wheel to sustain the same, a bracket carried by the handle bar stem and rigidly supported thereon, a rod carried by said bracket and projected substantially parallel to the fork head of the bicycle frame, a cross head slidably mounted on said rod, a spring carried by said rod beneath said cross head to tend always to move said cross head upwardly, said cross head having a pair of laterally projected bearings, a pair of connecting rods secured at one end in said bearings and having their other ends connected to said rocker arms.

3. An attachment for bicycles and the like comprising a pair of rocker arms pivoted to the forks of a bicycle and connected with the front wheel to sustain the same, a bracket carried by the handle bar stem and rigidly supported thereon, a rod carried by said bracket and projected substantially parallel to the fork head of the bicycle frame, a cross head slidably mounted on said rod, a spring carried by said rod beneath said cross head to tend to always move said cross head upwardly, said cross head having a pair of rearwardly projected bearings, a pair of connecting rods secured at one end in said bearings and having their other ends connected to said rocker arms, and a washer interposed between said cross head and said bracket on said first mentioned rod.

4. An attachment for bicycles and the like comprising a bracket member having a split bearing portion to embrace the handle bar stem and project to the front of the bicycle frame, means for rigidly clamping said bracket in position, a resiliently mounted cross head pivotally connected with said bracket, rocker arms connected with the forks of said frame and to the front wheel of said bicycle, connecting rods having one end secured to said rocker arms and their other ends secured to said cross head.

5. A bicycle attachment comprising a pair of rocker arms pivotable to the ends of the bicycle forks, said rocker arms having end bearings to effect connection with the front wheel of a bicycle and having other end bearings, connecting rods secured to said other end bearings, a clamp bracket securable to the handle bar stem, a rod carried by said bracket, a cross head slidably mounted on said rod, said rod having an abutment on the lower end, a spring on said rod between said cross head and said abutment tending to lift said cross head, said cross head having bearings, said connecting rods each having one end held in said bearings, all being arranged substantially as shown and described.

JAMES H. CLARK.

Witnesses:
W. A. CHILDREY,
E. J. BEGGS.